United States Patent
Moore et al.

(10) Patent No.: US 7,084,737 B1
(45) Date of Patent: Aug. 1, 2006

(54) METHOD AND APPARATUS FOR LOCATING A NEARBY ALTERNATE VENDING MACHINE FOR A DESIRED PRODUCT

(75) Inventors: Morris Anthony Moore, Southlake, TX (US); Jheroen Pieter Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/378,586

(22) Filed: Aug. 20, 1999

(51) Int. Cl.
*G05B 19/00* (2006.01)

(52) U.S. Cl. ............... 340/5.91; 340/5.92; 340/825.35; 340/825.36; 340/825.49; 705/22; 705/28; 705/29

(58) Field of Classification Search ................. 340/5.9, 340/5.91, 5.92, 825.35, 825.36, 825.49; 705/22, 705/28, 29
See application file for complete search history.

(56) References Cited

U.S. PATENT DOCUMENTS

| 5,091,713 | A | | 2/1992 | Horne et al. ................. 340/340 |
| 5,525,967 | A | * | 6/1996 | Azizi et al. .................. 340/573 |
| 5,930,771 | A | | 7/1999 | Stapp ......................... 705/705 |
| 6,418,416 | B1 | * | 7/2002 | Rosenberg et al. |

* cited by examiner

*Primary Examiner*—Brian Zimmerman
*Assistant Examiner*—Vermal Brown
(74) *Attorney, Agent, or Firm*—Hisashi D. Watanabe (57) ABSTRACT

A communication network (FIG. 1) makes available, to a first vending machine (102) of a plurality of vending machines, information from nearby ones of the plurality of vending machines for coordinating product availability and vending machine location. The first vending machine then determines 502 that the desired product is no longer available at the first vending machine. Thereafter, the first vending machine obtains (504–520) the information including a location of the nearby alternate vending machine for the desired product. The first vending machine then conveys (410) the location of the nearby alternate vending machine to a customer who wishes to purchase the desired product.

3 Claims, 6 Drawing Sheets

METHOD AND APPARATUS FOR LOCATING A NEARBY ALTERNATE VENDING MACHINE FOR A DESIRED PRODUCT

FIELD OF THE INVENTION

This invention relates in general to wireless communication systems, and more specifically to a method and apparatus in a plurality of vending machines for locating a nearby alternate vending machine for a desired product.

BACKGROUND OF THE INVENTION

Vending machines are well known. Such machines have been used for decades to dispense soft drinks, snacks, tickets, and other non-perishable products. An advantage of vending machines is that they can provide products for potential buyers on a twenty-four hour per day basis without the need for a salesperson.

The inventory of vending machines is replenished periodically by an attendant. A potential problem with vending machines is that certain high-demand products can be depleted before the attendant's next scheduled restocking visit. Most people have experienced the frustration of visiting a vending machine to purchase a favorite soft drink or snack, only to find that the vending machine has sold out of the desired product. While the desired product may be available in another nearby vending machine, this information has not been presented to the potential buyer by the prior-art vending machine. Such information would be valuable in helping the potential buyer locate a nearby vending machine that can supply the desired product.

Thus, what is needed is a method and apparatus in a first vending machine of a plurality of vending machines for locating a nearby alternate vending machine having a desired product. Preferably, the method and apparatus will operate to quickly convey to the potential buyer the location of the nearby alternate vending machine having the desired product.

SUMMARY OF THE INVENTION

An aspect of the present invention is a method in a first vending machine of a plurality of vending machines for locating a nearby alternate vending machine having a desired product. The method comprises the steps of making available to the first vending machine information from nearby ones of the plurality of vending machines for coordinating product availability and vending machine location; and determining, by the first vending machine, that the desired product is no longer available at the first vending machine. The method further comprises the steps of obtaining thereafter, by the first vending machine, the information comprising a location of the nearby alternate vending machine for the desired product, and conveying by the first vending machine the location to a customer.

Another aspect of the present invention is an apparatus in a first vending machine having an inventory sensor and a customer interface, the apparatus for locating a nearby alternate vending machine having a desired product. The apparatus comprises a transceiver for providing communications, and a processing system coupled to the transceiver for controlling the transceiver and processing the communications, the processing system further coupled to the inventory sensor and the customer interface. The processing system is programmed to cooperate with the inventory sensor to determine that the desired product is no longer available at the first vending machine, and cooperate with the transceiver to obtain information made available to the first vending machine from a plurality of vending machines for coordinating product availability and vending machine location, the information comprising a location of the nearby alternate vending machine for the desired product. The processing system is further programmed to cooperate with the customer interface to convey the location to the customer.

Another aspect of the present invention is a server for determining a location of an alternate vending machine near a first vending machine, the alternate vending machine having a desired product that is unavailable at the first vending machine. The server comprises a processing system, and a transceiver coupled to the processing system for communicating with a plurality of vending machines. The processing system is programmed to cooperate with the transceiver to receive from the first vending machine a first query regarding the desired product, and to determine a candidate alternate vending machine near the first vending machine. The processing system is further programmed to transmit a second query regarding the desired product to the candidate alternate vending machine, and to receive a response from the candidate alternate vending machine indicating that the desired product is available, thereby defining the candidate alternate vending machine as the alternate vending machine for the desired product. The processing system is also programmed to return to the first vending machine the location of the alternate vending machine.

Another aspect of the present invention is a server for locating an alternate vending machine near a first vending machine, the alternate vending machine having a desired product that is unavailable at the first vending machine. The server comprises a processing system, and a transceiver coupled to the processing system for communicating with a plurality of vending machines. The processing system is programmed to receive from ones of the plurality of vending machines a product availability indicator whenever a product availability changes, and to maintain a database of current product availability indicators and corresponding vending machine locations. The processing system is further programmed to receive a request from the first vending machine for a location of the alternate vending machine for the desired product, when the customer selects the desired product at the first vending machine; and to send the location to the first vending machine.

DETAILED DESCRIPTION OF THE INVENTION

Figure 1:
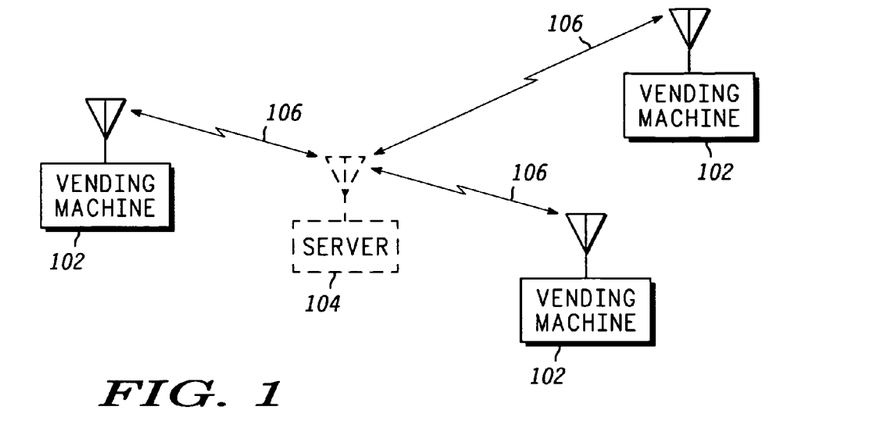
FIG. 1 is a simplified block diagram of a communication network of vending machines in accordance with the present invention.

FIG. 1 is a simplified block diagram of a communication network of vending machines 102 in accordance with the present invention. The communication network comprises a plurality of vending machines 102 coupled by conventional communication links 106 for coordinating product availability and vending machine location. In some embodiments, the communication network includes a server 104, which acts as a central repository of product availability and location information for the communication network.

The communication links 106 preferably are wireless for simplifying vending machine placement. Virtually any type of wireless link can be utilized, including direct peer-to-peer links, and repeated links such as those of conventional radio messaging and cellular telephone systems. It will be appreciated that wired links can be used as well for all, or a portion of, the communication links 106.

Figure 2:
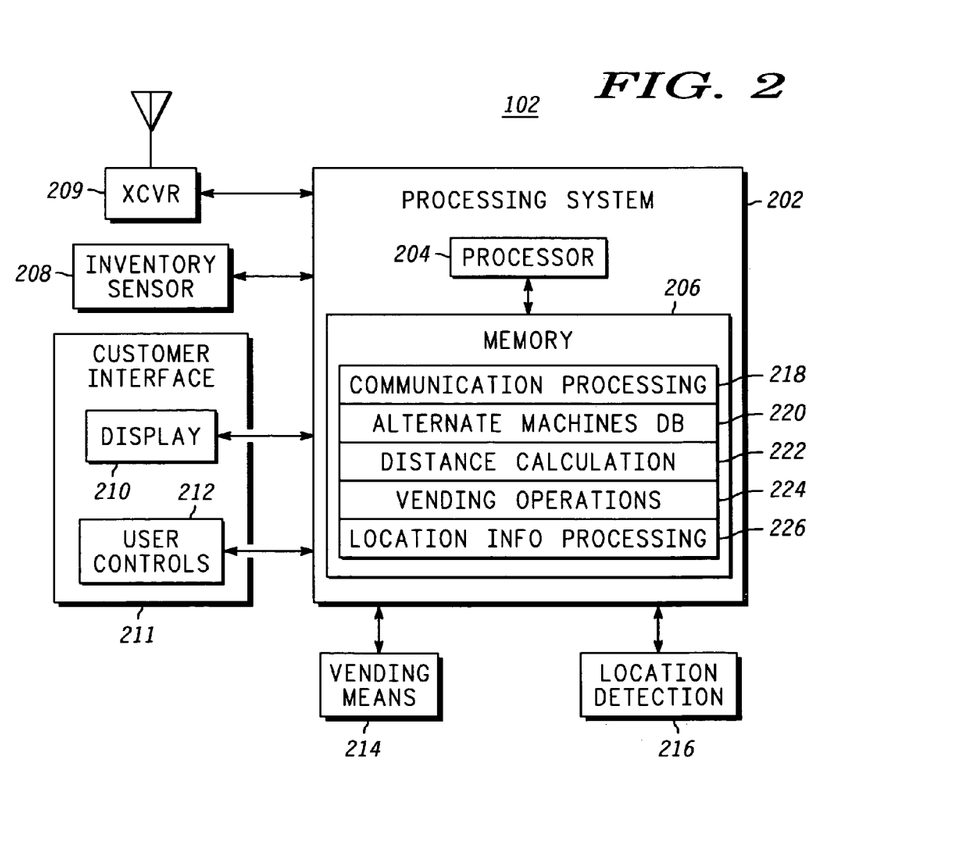
FIG. 2 is an electrical block diagram of an exemplary vending machine in accordance with the present invention.

FIG. 2 is an electrical block diagram of an exemplary vending machine 102 in accordance with the present invention. The vending machine 102 comprises a processing system 202, including a processor 204 and memory 206, for directing the operation of the vending machine 102 in accordance with the present invention. The processing system 202 is coupled to a conventional transceiver 209 for providing two-way communications. The processing system 202 is further coupled to a conventional inventory sensor 208 for sensing the inventory of products stocked by the vending machine 102. The processing system 202 is also coupled to a conventional customer interface 211 for interfacing with a customer. The customer interface 211 preferably includes a conventional display 210 and conventional user controls 212 e.g., selection buttons. It will be appreciated that, alternatively, the customer interface 211 can include additional devices, such as a loudspeaker and a touch screen. The processing system 202 is further coupled to a conventional vending means 214 for vending the products through well-known techniques. In some embodiments, the vending machine 102 also includes a location detection device 216, such as a Global Positioning System (GPS) receiver.

The memory 206 includes a communication processing program 218 for programming the processing system to process communications in accordance with the present invention. The memory 206 preferably also includes an alternate machines database 220 for storing information about the locations of nearby alternate vending machines that are able to supply products that are no longer available in the vending machine 102. In one embodiment, the memory 206 further comprises a distance calculation program 222 for programming the processing system 202 to calculate the distance between the vending machine 102 and a candidate alternate vending machine 102. In addition, the memory 206 preferably includes a conventional vending operations program 224 for programming the processing system 202 to vend products through well-known techniques. It will be appreciated that, alternatively, the vending operations can be performed and controlled independently of the processing system 202.

The memory 206 also includes a location information processing program 226 for programming the processing system 202 to process location information through well-known techniques, such as location determination that uses the resources of the wireless communication system itself. This may be based on tokens (TX ID, zone, Local Area ID) or on the measurement of timing, RSSI, and the like. For embodiments that include the location detection device 216 and the server 104, the location information processing program 226 preferably programs the processing system 202 to cooperate with the server 104 to determine the geographic coordinates at which the vending machine 102 is positioned, using well-known techniques. Operation of the vending machine 102 in accordance with the present invention is described in further detail herein below.

Figure 3:
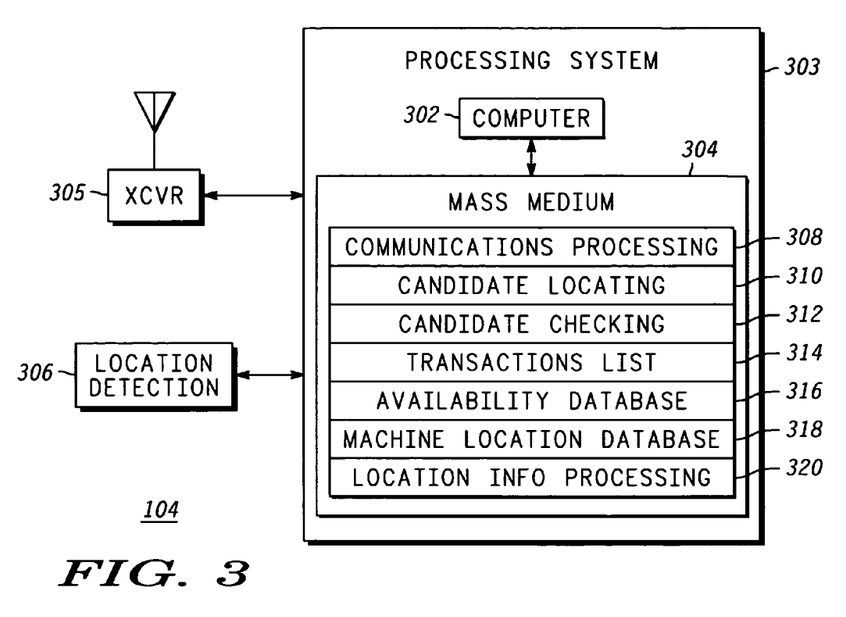
FIG. 3 is an electrical block diagram of an exemplary server in accordance with the present invention.

FIG. 3 is an electrical block diagram of an exemplary server 104 in accordance with the present invention. The server 104 comprises a processing system 303, including a conventional computer 302 and a mass medium 304, e.g. a conventional magnetic disc drive. The processing system 303 is coupled to a conventional transceiver 305 for communicating with the plurality of vending machines 102. In one embodiment, the server 104 includes a location detection device 306, e.g., a GPS receiver, coupled to the processing system 303 for cooperating with a similarly equipped vending machine 102 to determine the location of the vending machine 102.

The mass medium 304 comprises a communications processing program 308 for programming the processing system 303 to communicate with the plurality of vending machines 102 in accordance with the present invention. The mass medium 304 further comprises a candidate locating program 310 for programming the processing system 303 to find a candidate alternate vending machine 102 that is near, e.g., within one-hundred meters of, a first vending machine 102 that has exhausted its supply of a desired product. The mass medium 304 also includes a candidate checking program 312 for programming the processing system 303 to check whether the candidate alternate vending machine 102 has the desired product. The mass medium 304 further comprises space for a transactions list 314 which includes identifiers of the first vending machine, the alternate vending machine, and the desired product that associates the two machines.

In one embodiment of the present invention, the mass medium 304 includes an availability database 316 for indicating the current availability of products in the vending machines 102 of the communication system. The mass medium further comprises a machine location database 318 for cross-referencing vending machine identities with vending machine locations. Preferably, the machine location database 318 also includes sufficient information to provide instructions about how to get from one vending machine 102 to a nearby alternate vending machine 102. In some embodiments, the mass medium 304 includes a location information processing program 320 for programming the processing system 303 to cooperate with the plurality of vending machines 102 to help determine the locations of the plurality of vending machines, through well-known techniques, e.g., server-aided GPS technology. Operation of the server 104 in accordance with the present invention is described in greater detail herein below.

Figure 4:
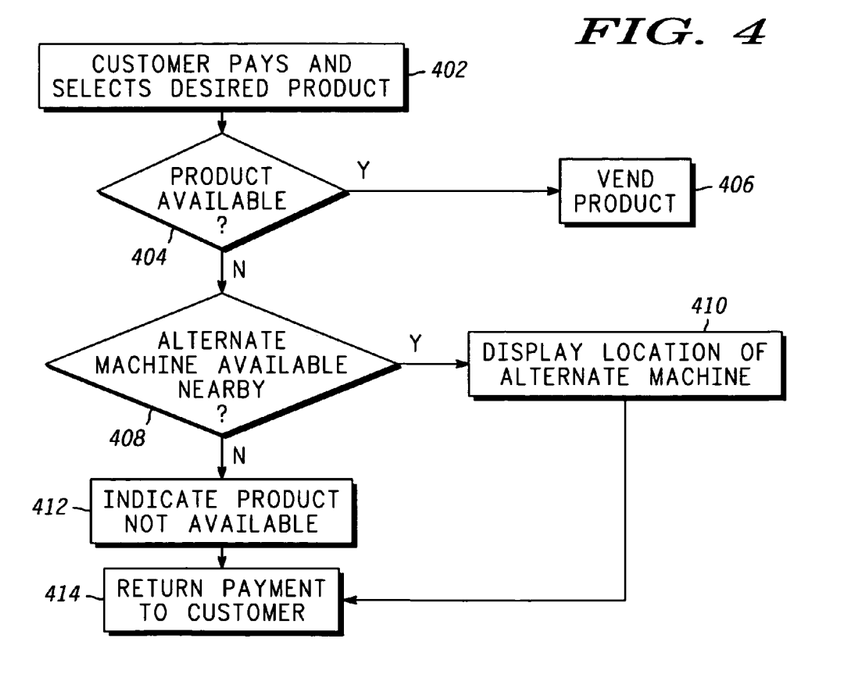
FIG. 4 is a flow diagram summarizing operation of the vending machine in accordance with the present invention.

FIG. 4 is an flow diagram summarizing operation of the vending machine 102 in accordance with the present invention. The flow begins when a customer pays and selects 402 a desired product. (It will be appreciated that, for some types of payment methods, e.g., credit cards, payment is not taken until the desired product is determined to be available.) In response, the processing system 202 checks 404 the inventory sensor 208 for availability of the desired product. If the product is available, the processing system 202 cooperates with the vending means 214 to vend 406 the product. If the product is not available, the processing system 202 determines whether a nearby alternate vending machine 102 is available for the desired product. If so, the vending machine 102 displays 410 the location of the nearby alternate vending machine 102, preferably along with brief instructions concerning how to get to the alternate machine, and then returns 414 the payment to the customer. If there is not an alternate machine available nearby, the vending machine 102 displays 412 that the product is not available, and then returns 414 the payment to the customer. It will be appreciated that unavailability of the desired product can result from several causes. For example, the desired product can be sold out, the dispenser for the desired product can be jammed or otherwise inoperative, a local ordinance can prevent the sale of the desired product at this time, and a refrigeration failure can render the desired product unpalatable, thereby terminating dispensing of the product, to name a few possible causes of unavailability. Any such causes that can be detected can trigger a search for a nearby alternate vending machine in accordance with the present invention. Detailed operation of several embodiments are presented herein below.

Figure 5:
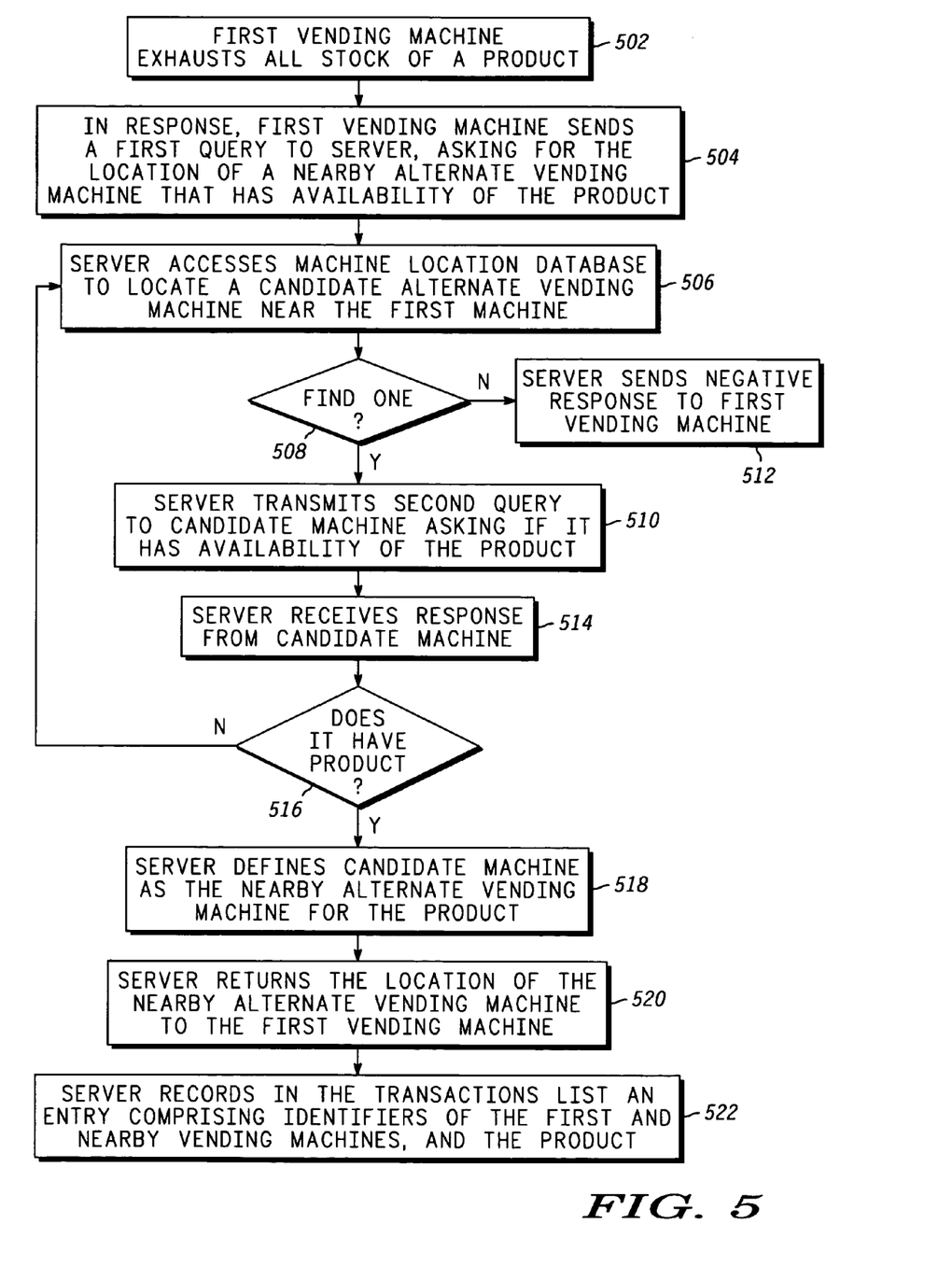
FIG. 5 is a flow diagram depicting a first operation of a server-based network in accordance with the first embodiment of the present invention.

FIG. 5 is a flow diagram depicting a first operation of a server-based network in accordance with the first embodiment of the present invention. Flow begins when a first vending machine 102 exhausts 502 all stock of a product. In response, the first vending machine 102 sends 504 a first query to the server 104, asking for the location of a nearby alternate vending machine 102 that has availability of the product. (It will be appreciated that, alternatively, the first vending machine 102 could merely report that the product has become unavailable, leaving the query implicit.) The server 104 accesses 506 the machine location database 318 to locate a candidate alternate vending machine 102 near the first vending machine 102. The server 104 then checks whether it has located a candidate alternate vending machine 102 less than a predetermined distance from the first vending machine 102. If not, the server sends a negative response to the first vending machine 102 If, on the other hand, the server 104 has located a candidate alternate vending machine 102, the server. 104 transmits 510 a second query to the candidate alternate vending machine 102 asking whether the candidate alternate vending machine 102 has availability of the product. The server 104 then receives 514 a response from the candidate alternate vending machine 102. The server then checks 516 whether the candidate alternate vending machine 102 has the product. If not, the flow returns to step 506 where the server continues to search for another candidate alternate vending machine 102 that may have the product. If, on the other hand, at step 516 the candidate alternate vending machine 102 does have the product, then the server 104 defines 518 the candidate alternate vending machine 102 as the nearby alternate vending machine 102 for the product. The server then checks the machine location database 318 and returns 520 the location of the nearby alternate vending machine 102 to the first vending machine 102. The server 104 then records in the transactions list 314 an entry comprising identifiers of the first vending machine 102 and the nearby alternate vending machine 102, along with the product, so that the server 104 can send future updates to the first vending machine 102, as described in FIG. 6.

Figure 6:
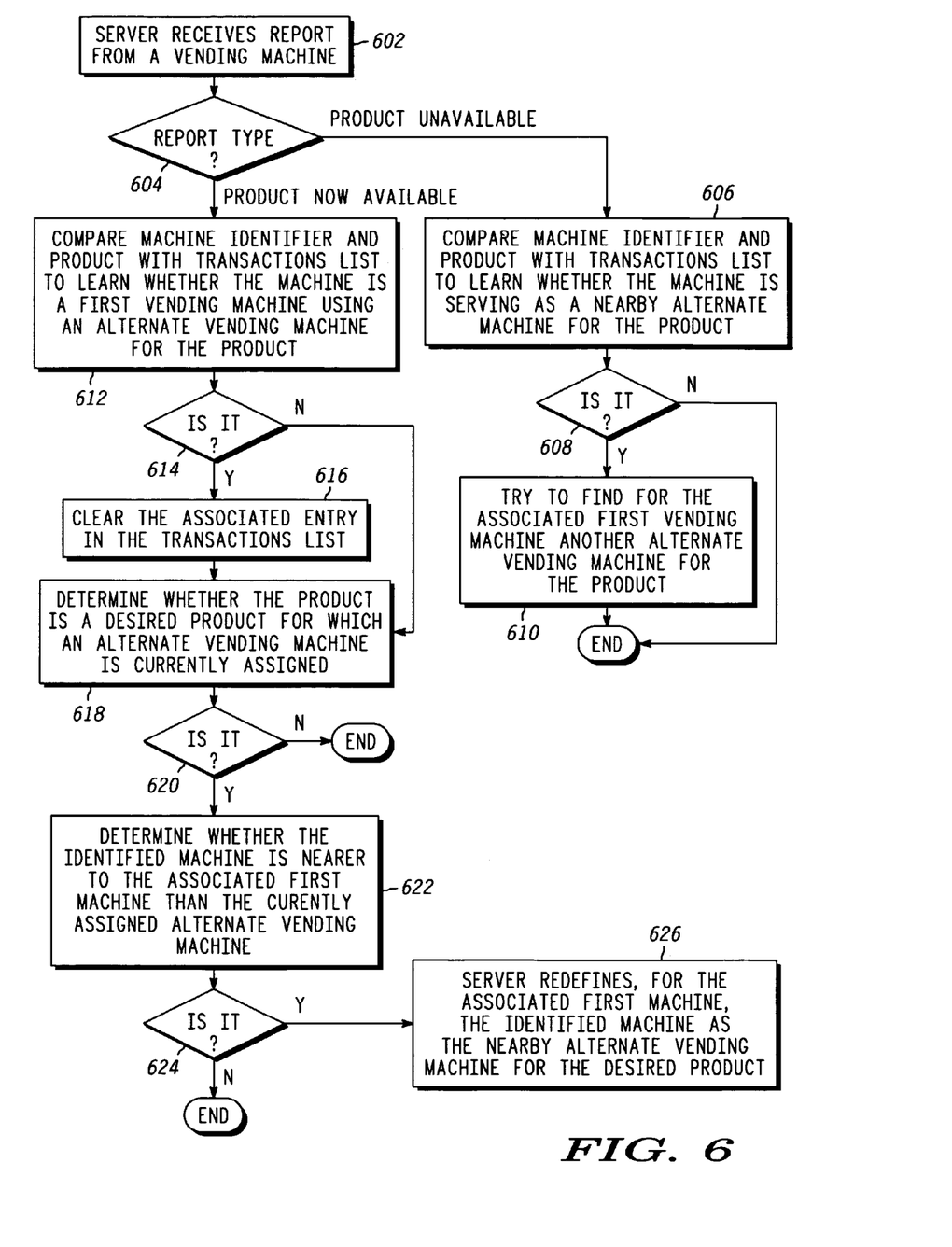
FIG. 6 is a flow diagram depicting a second operation of the server-based network in accordance with the first embodiment of the present invention.

FIG. 6 is a flow diagram depicting a second operation of the server-based network in accordance with the first embodiment of the present invention. The flow begins when the server receives 602 a report from one of the plurality of vending machines 102. The server 104 then checks 604 the report type. If the report type is an PRODUCT UNAVAILABLE type, then the server compares 606 the machine identifier and the product with the transactions list 314 to learn whether the reporting machine is serving as a nearby alternate vending machine 102 for the product. If not, the process ends. If, on the other hand, the reporting machine is serving as a nearby alternate vending machine 102, then the server 104 tries 610 to find for the associated first vending machine 102 another nearby alternate vending machine 102 for the product, as described in steps 506 through 522 of FIG. 5.

If at step 604 the report type is PRODUCT NOW AVAILABLE, then the server 104 compares 612 the machine identifier and product with the transactions list 314 to learn whether the machine is a first vending machine 102 using a nearby alternate vending machine 102 for the product. If so, the first vending machine 102 has been restocked, and the server 104 clears 616 the associated entry in the transactions list 314 and proceeds to step 618. If not, the server 104 proceeds directly to step 618 to determine from the transactions list 314 whether the product is a desired product for which a nearby alternate vending machine 102 is currently assigned. If not, at step 620 the process ends. If so, at step 620 the flow proceeds to step 622, where the server 104 determines whether the reporting machine is nearer to the associated first vending machine 102 than the currently assigned nearby alternate vending machine 102. If so, at step 624 the flow moves to step 626, where the server 104 redefines, for the associated first vending machine 102, the reporting machine as the nearby alternate vending machine 102 for the desired product. If, on the other hand, the reporting machine is not nearer, at step 624 the process ends. It will be appreciated that the steps 618–626 can be repeated for multiple vending machines 102 near the reporting vending machine 102. Thus, in the manner just described in the flow chart of FIG. 6, the server 104 advantageously continuously updates the product availability status of vending machines 102 that have a nearby alternate vending machine 102 defined for a product.

The first embodiment, just described, is particularly suitable when the communication links 106 have high latency. This is because the nearby alternate vending machine 102 and updates thereto are defined in advance of a customer selection of a desired product. By storing the nearby alternate vending machine information in the associated first vending machines 102, no communication with the server 104 is required when the customer selects a desired product. Thus, advantageously, there is little delay in displaying the message identifying the location of a nearby alternate vending machine 102 which has the desired product.

Figure 7:
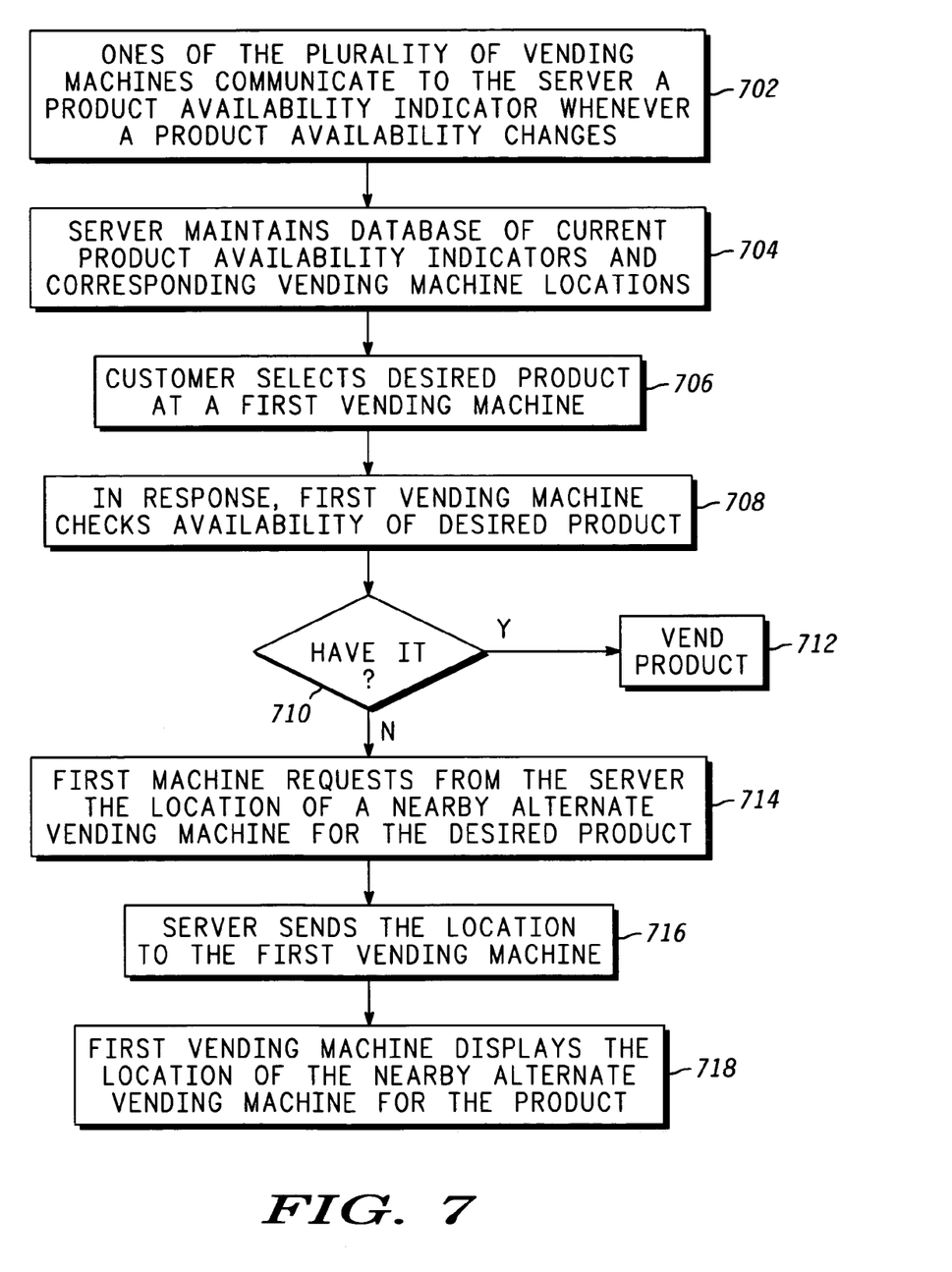
FIG. 7 is a flow diagram depicting operation of a server-based network in accordance with a second embodiment of the present invention.

FIG. 7 is a flow diagram depicting operation of a server-based network in accordance with a second embodiment of the present invention. The second embodiment is preferred for systems in which the communication link latency is low. The flow begins with ones of the plurality of vending machines 102 communicating 702 to the server 104 a product availability update whenever a product availability changes, i.e., becomes either sold out or becomes restocked.

The server 104 maintains 704 a database of current product availability indicators and corresponding vending machine locations.

A customer then selects 706 a desired product at a first vending machine 102. In response, the first vending machine 102 checks 708 availability of the desired product through the inventory sensor 208. When at step 710 the first vending machine 102 has the desired product, it vends 712 the product. When the first vending machine 102 does not have the product, flow moves to step 714, where the first vending machine 102 requests from the server 104 the location of a nearby alternate vending machine 102 for the desired product. The server 104 then sends 716 the location to the first vending machine 102, and the first vending machine 102 displays 718 the location of the nearby alternate vending machine 102 for the product. An advantage of the second embodiment is that the availability database 316 of the server 104 is updated quickly in response to product availability changes, and thus the information is kept highly current.

Figure 8:
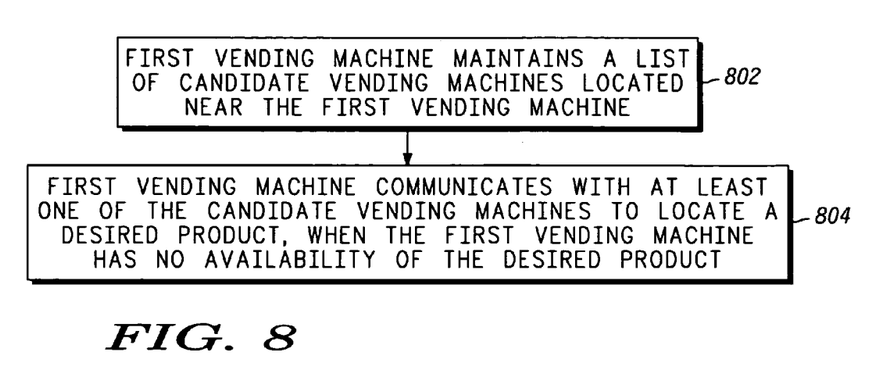
FIG. 8 is a flow diagram depicting operation of a non-server-based network in accordance with a third embodiment of the present invention.

FIG. 8 is a flow diagram depicting operation of a non-server-based network in accordance with a third embodiment of the present invention. In this embodiment, the first vending machine 102 maintains 802 a list of candidate vending machines located near the first vending machine 102. The list, for example, can be pre-programmed during installation of the first vending machine 102, identifying candidate alternate vending machines 102 in order of nearness to the first vending machine 102, along with directions for getting to the alternate machine. The first vending machine 102 then communicates 804 with at least one of the candidate alternate vending machines of the list to locate a desired product, when the first vending machine has no availability of the desired product. The third embodiment advantageously is simple and inexpensive, and requires no server 104.

Figure 9:
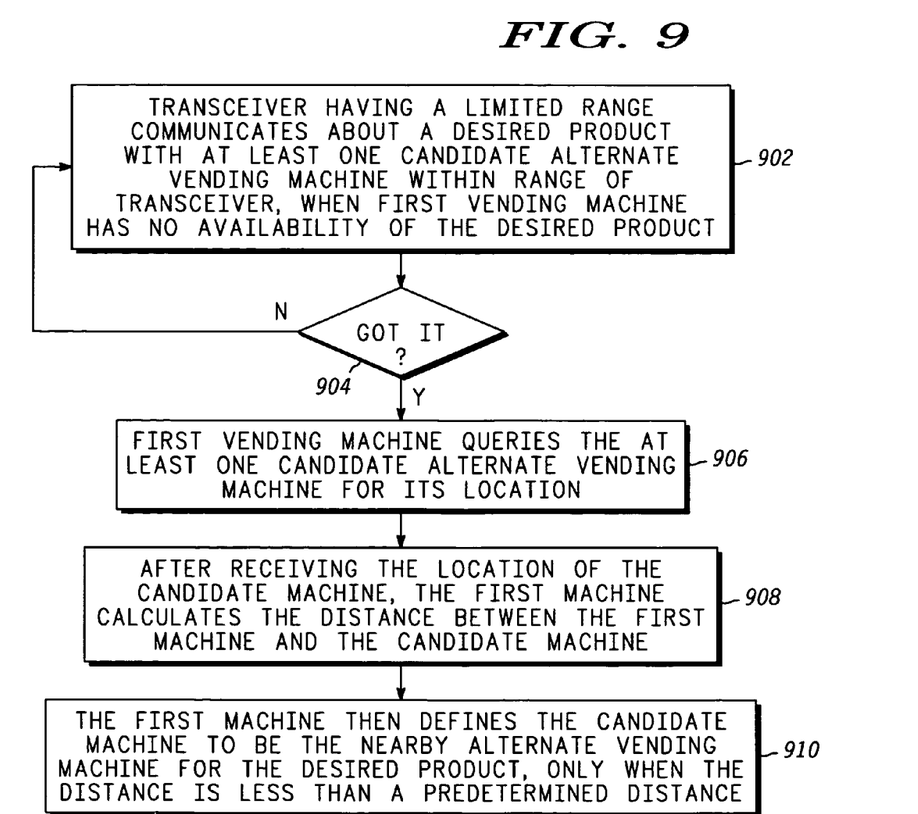
FIG. 9 is a flow diagram depicting operation of a non-server-based network in accordance with a fourth embodiment of the present invention.

FIG. 9 is a flow diagram depicting operation of a non-server-based network in accordance with a fourth embodiment of the present invention. In the fourth embodiment, the transceivers 209 have a limited transmission range. The flow begins when a transceiver 209 of a first vending machine 102 communicates 902 about a desired product with at least one candidate alternate vending machine 102 within range of the transceiver 209, when the first vending machine 102 has no availability of the desired product. The first vending machine 102 then checks 904 whether the candidate alternate vending machine 102 has responded that it does have the desired product. If not, the first vending machine 102 returns to step 902 to attempt to communicate with another candidate alternate vending machine 102. When the candidate alternate vending machine 102 has the desired product, the first vending machine 102 then queries 906 the at least one candidate alternate vending machine 102 for its location. After receiving the location of the candidate alternate vending machine 102, the first vending machine 102 calculates 908 the distance between the first vending machine 102 and the candidate alternate vending machine 102. Only when the distance is less than a predetermined distance, the first vending machine 102 then defines 910 the candidate alternate vending machine 102 to be the nearby alternate vending machine 102 for the desired product. The fourth embodiment preferably utilizes the location detection device 306 for providing geographic coordinates of the position of the vending machine 102. This embodiment advantageously can be used even when the vending machines 102 are moved frequently. In this embodiment, directions to the nearby alternate vending machine can be conveyed, for example, by a compass heading and a distance.

Thus, it should be clear from the preceding disclosure that the present invention advantageously provides a method and apparatus in first vending machine of a plurality of vending machines for locating a nearby alternate vending machine having a desired product. Advantageously, the method and apparatus operate to quickly convey to the potential buyer the location of the nearby alternate vending machine having the desired product. Both server-based and non-server-based systems have been disclosed.

Many modifications and variations of the present invention are possible in light of the above teachings. Thus, it is to be understood that, within the scope of the appended claims, the invention can be practiced other than as specifically described herein above.

What is claimed is:

1. A server for determining a location of an alternate vending machine near a first vending machine, the alternate vending machine having a desired product that is unavailable at the first vending machine, the server comprising:
 a processing system; and
 a transceiver coupled to the processing system for communicating with a plurality of vending machines,
 wherein the processing system is programmed to:
  cooperate with the transceiver to receive from the first vending machine a first query regarding the desired product;
  determine a candidate alternate vending machine near the first vending machine;
  transmit a second query regarding the desired product to the candidate alternate vending machine;
  receive a response from the candidate alternate vending machine indicating that the desired product is available, thereby defining the candidate alternate vending machine as the alternate vending machine for the desired product;
  return to the first vending machine said location of the alternate vending machine;
  record, in a transactions list, an entry comprising identifiers of the first vending machine, the alternate vending machine, and the desired product;
  receive a report from one of the plurality of vending machines indicating that a product is no longer available;
  compare an identifier of the one of the plurality of vending machines and the product with the transactions list to determine whether the one of the plurality of vending machines is serving as the alternate vending machine for the product; and
  find for the first vending machine another alternate vending machine for the product, when the one of the plurality of vending machines is serving as the alternate vending machine for the product.

2. A server for determining a location of an alternate vending machine near a first vending machine, the alternate vending machine having a desired product that is unavailable at the first vending machine, the server comprising:
 a processing system; and
 a transceiver coupled to the processing system for communicating with a plurality of vending machines,
 wherein the processing system is programmed to:
  cooperate with the transceiver to receive from the first vending machine a first query regarding the desired product;

determine a candidate alternate vending machine near the first vending machine;

transmit a second query regarding the desired product to the candidate alternate vending machine;

receive a response from the candidate alternate vending machine indicating that the desired product is available, thereby defining the candidate alternate vending machine as the alternate vending machine for the desired product;

return to the first vending machine said location of the alternate vending machine;

record, in a transactions list, an entry comprising identifiers of the first vending machine, the alternate vending machine, and the desired product;

receive a report from one of the plurality of vending machines indicating that a product has become available;

compare an identifier of the one of the plurality of vending machines and the product with the transactions list to determine whether the one of the plurality of vending machines is the first vending machine and the product is the desired product; and clear the entry in the transactions list, when the one of the plurality of vending machines is the first vending machine and the product is the desired product.

3. The server of claim 2, wherein the processing system is further programmed to:

determine whether the one of the plurality of vending machines is nearer than the alternate vending machine is to the first vending machine, when the one of the plurality of vending machines is not the first vending machine and the product is the desired product; and redefine, for the first vending machine, the one of the plurality of vending machines as the alternate vending machine for the desired product, when the server has determined the one of the plurality of vending machines is nearer to the first vending machine.

* * * * *